(12) United States Patent
Tomiyama et al.

(10) Patent No.: US 11,283,309 B2
(45) Date of Patent: Mar. 22, 2022

(54) BRUSHLESS MOTOR AND WINDING METHOD FOR STATOR

(71) Applicant: SHINANO KENSHI KABUSHIKI KAISHA, Nagano (JP)

(72) Inventors: Shou Tomiyama, Nagano (JP); Makoto Aida, Nagano (JP)

(73) Assignee: SHINANO KENSHI KABUSHIKI KAISHA, Nagano (JP)

( * ) Notice: Subject to any disclaimer, the term of this patent is extended or adjusted under 35 U.S.C. 154(b) by 705 days.

(21) Appl. No.: 16/037,514

(22) Filed: Jul. 17, 2018

(65) Prior Publication Data
US 2019/0074733 A1    Mar. 7, 2019

(30) Foreign Application Priority Data
Sep. 4, 2017    (JP) .............................. JP2017-169829

(51) Int. Cl.
| | |
|---|---|
| *H02K 1/14* | (2006.01) |
| *H02K 21/22* | (2006.01) |
| *H02K 29/03* | (2006.01) |
| *H02K 1/27* | (2006.01) |
| *H02K 15/095* | (2006.01) |

(Continued)

(52) U.S. Cl.
CPC .............. *H02K 1/146* (2013.01); *F24F 7/007* (2013.01); *H02K 1/2786* (2013.01); *H02K 3/18* (2013.01); *H02K 7/085* (2013.01); *H02K 15/022* (2013.01); *H02K 15/095* (2013.01); *H02K 29/03* (2013.01); *H02K 15/12* (2013.01); *H02K 2201/09* (2013.01)

(58) Field of Classification Search
CPC ........ H02K 1/146; H02K 1/2786; H02K 3/18; H02K 1/12; H02K 1/14; H02K 1/16; H02K 7/085
See application file for complete search history.

(56) References Cited

U.S. PATENT DOCUMENTS

| | | | |
|---|---|---|---|
| 9,948,151 B2 | 4/2018 | Ando et al. | |
| 2015/0139830 A1* | 5/2015 | Nigo | ...................... H02K 1/146 |
| | | | 417/410.1 |
| 2016/0313973 A1 | 10/2016 | Yajima | |

FOREIGN PATENT DOCUMENTS

| | | |
|---|---|---|
| EP | 2 980 970 | 2/2016 |
| JP | 2011-193573 | 9/2011 |
| JP | 2012-16146 | 1/2012 |

(Continued)

OTHER PUBLICATIONS

Office Action dated Jan. 23, 2019 in corresponding European Application No. 18183653.7.

(Continued)

*Primary Examiner* — Burton S Mullins
(74) *Attorney, Agent, or Firm* — Stephen J. Weyer, Esq.; Stites & Harbison, PLLC

(57) ABSTRACT

A brushless motor that can uniformly wind a coil winding at a low cost even with a stator core in which intervals between tooth tips of a plurality of pole teeth provided in a circumferential direction of an annular section to protrude in a radial direction differ. An auxiliary tooth tip section is formed integrally on a tooth tip of a required pole tooth of a stator core in which a plurality of pole teeth are provided in a circumferential direction of an annular section to protrude in a radial direction, and in which circumferential intervals between adjacent tooth tips are not uniform, and gaps between the tooth tips of all the pole teeth of the stator core are formed uniform.

3 Claims, 8 Drawing Sheets

(51) Int. Cl.
*F24F 7/007* (2006.01)
*H02K 1/2786* (2022.01)
*H02K 3/18* (2006.01)
*H02K 7/08* (2006.01)
*H02K 15/02* (2006.01)
*H02K 15/12* (2006.01)

(56) References Cited

FOREIGN PATENT DOCUMENTS

| | | |
|---|---|---|
| JP | 2012-50195 | 3/2012 |
| JP | 2013-62889 | 4/2013 |
| WO | WO-2016/194829 | 12/2016 |

OTHER PUBLICATIONS

Office Action dated Aug. 20, 2019 in corresponding Japanese Application No. 2017-169829.

* cited by examiner

ENLARGED Q

PRIOR ART

BRUSHLESS MOTOR AND WINDING METHOD FOR STATOR

CROSS-REFERENCE TO RELATED APPLICATION

This application is based upon and claims the benefit of priority of the prior Japanese Patent Application No. 2017-169829, filed on Sep. 4, 2017, and the entire contents of which are incorporated herein by reference.

TECHNICAL FIELD

The present disclosure relates to a brushless motor for use in, for example, an HVAC (Heating, Ventilation, and Air Conditioning) device and the like and a winding method for a stator.

BACKGROUND ART

A configuration of a stator and a rotor of, for example, an outer rotor three-phase DC brushless motor will be described with reference to FIG. 10. A structure of a stator 1 will be described. As a stator core 4, a laminated core in which magnetic steel sheets are laminated is used. A plurality of pole teeth 4a are provided to protrude from an annular core main body outward in a radial direction. A coil, which is not shown, is wound around each pole tooth 4a. The stator core 4 is press fitted, bonded, and thereby assembled to an outer circumference of a bearing housing, which is not shown. A bearing is fitted into the bearing housing.

A rotor 8 is integrally assembled to the stator 1 by caulking a rotor yoke 12 formed into a cup shape with a rotor hub fixed to one end of a rotor shaft. A ring-shaped rotor magnet 13 in which are magnetized to multiple poles in a circumferential direction is assembled to an inner circumferential surface of this rotor yoke 12. After assembling the stator 1, the rotor shaft is inserted into the bearing of the bearing housing to fit the rotor 8 into the stator 1. At this time, the rotor 8 is assembled to the stator core 4 so that the pole teeth 4a of the stator core 4 face the rotor magnet 13.

In a case of holding the rotor at a certain position in a state in which the motor is not excited, measures are taken to improve a holding torque (cogging torque). In this case, it is necessary that the pole teeth of the stator core face the magnetic poles of the rotor magnet on a one-by-one basis. However, a magnetic circuit is not always formed simply by arranging the stator core and the rotor magnet to face each other; thus, it is proposed to improve the holding torque by preparing a core other than the stator core and causing pole teeth to face the magnetic poles of the rotor magnet on a one-by-one basis (refer to PTL 1: JP-A-2015-89327).

SUMMARY OF INVENTION

Technical Problem

On the other hand, it is conceived to improve the cogging torque by changing gaps formed between tooth tips of the pole teeth of the stator core to increase the number of pole teeth facing the magnetic poles of the rotor magnet without increasing the number of components of the stator, and by making each pole tooth of the stator core into an asymmetric shape with respect to an axis line in a radial direction. In a case of winding a magnet wire around each pole teeth of the stator core by, for example, a flyer-driven coil winding machine, a center former movable in a radial direction of the pole teeth and side formers covering adjacent pole teeth are arranged, a flyer that holds a nozzle is rotated to revolve the magnet wire around the pole tooth to be wound around the pole tooth, and the center former is moved in the radial direction whenever the wire is revolved, thereby sequentially winding the magnet wire around the pole tooth from a proximal end portion of the pole tooth (annular core back section) toward a tip end thereof to form a coil in open slots.

However, shapes of the tooth tip of the pole teeth are asymmetric with respect to the axis line in the radial direction in the laminated core formed by annularly punching magnetic steel sheets, resulting in non-uniform intervals for inducing the magnet wire into the open slots formed around each pole tooth. Specifically, in a case of winding the magnet wire around each pole tooth, gaps are generated between the tooth tip and the side plates and the center former rattles and is unstable as the flyer of the coil winding machine rotates. Owing to this, there are concerns that the magnet wire cannot be wound uniformly around the pole tooth and an increased tension of the magnet wire causes breaking of the wire. This makes it necessary to produce coils with a slowed winding speed of the coil winding machine, possibly resulting in a reduction in productivity and an increase in a fraction defective.

Solution to Problem

Some embodiments described hereinafter have been accomplished to overcome these problems, and an object thereof is to provide a brushless motor that can uniformly wind a coil winding at a low cost even with a stator core in which intervals between tooth tips of a plurality of pole teeth provided in a circumferential direction of an annular section to protrude in a radial direction differ, and a winding method for a stator that can improve productivity and reduce a fraction defective by refining the winding method for the stator.

A disclosure related to some embodiments described below has at least the following configurations. A brushless motor includes: a stator including a stator core with a coil wound around a stator pole tooth; and a rotor having a rotor shaft that is provided in a central portion of a rotor yoke on which a rotor magnet facing the stator pole tooth is provided and that is rotatably, pivotally supported via a bearing, wherein an auxiliary tooth tip section is formed integrally on a tooth tip of a pole tooth of the stator core in which a plurality of pole teeth are provided in a circumferential direction of an annular section to protrude in a radial direction, and in which circumferential intervals between adjacent tooth tips are not uniform, and gaps between the tooth tips of all the pole teeth of the stator core are formed uniform.

In the stator core in which the plurality of pole teeth are provided in the circumferential direction of the annular section to protrude in the radial direction, and in which the circumferential intervals between the adjacent tooth tips are not uniform, a portion where the interval between the tooth tips of the pole teeth is relatively wide and a portion where the interval between the tooth tips of the pole teeth is relatively narrow are generated. However, the auxiliary tooth tip section is formed integrally on the tooth tip of the required pole tooth of the stator core in which the circumferential intervals between the adjacent tooth tips are not uniform, and the gaps between the tooth tips of all the pole teeth of the stator core are formed uniform. The auxiliary tooth tip section can be formed using various members such as a resin material, a metal material, and a rubber material.

Therefore, fixing each tooth tip of the stator core by the side plate of the coil winding machine makes it possible to uniformly wind a coil around each pole tooth, and efficiently performing winding work makes it possible to improve productivity and to reduce a fraction defective. A reduction in a strength of the pole tooth does not occur since the auxiliary tooth tip section is formed integrally on the tooth tip of the required pole tooth at a time of fixing each pole tip of the stator core by the side plate of the coil winding machine.

The auxiliary tooth tip section may be insert molded into the tooth tip of the required pole tooth of the stator core or coated (electrodeposition coated, resin coated, baked coated, metal coated, or the like) on the tooth tip of the required pole tooth in such a manner that gaps between the tooth tips of all the pole teeth of the stator core are formed uniform.

As a result, setting the stator core in a molding die and insert molding a material into the tooth tip of the required pole tooth or coating (spraying) the material onto the tooth tip of the required pole tooth makes it possible to make the gaps between the tooth tips of all the pole teeth of the stator core uniform.

A pair of insulators may be attached to both sides of the stator core in a motor axis direction to form the auxiliary tooth tip section integrally in part of the insulators in such a manner that gaps between the tooth tips of all the pole teeth are formed uniform.

As a result, only attaching the insulators to the stator core makes it possible to make uniform the gaps between the tooth tips of all the pole teeth of the stator core.

The auxiliary tooth tip section may be either bonded or welded to the tooth tip of the required pole tooth of the stator core in such a manner that gaps between all the tooth tips of the stator core are formed uniform.

As a result, bonding or welding the auxiliary tooth tip section to the tooth tip of the required pole tooth of the stator core makes it possible to make uniform the gaps between the tooth tips of all the pole teeth of the stator core.

The stator core may be configured such that a plurality of first pole teeth, second pole teeth, and third pole teeth are provided in the circumferential direction to protrude from the annular section in the radial direction, each of the first pole teeth having the tooth tip formed symmetric with respect to the axial line in the radial direction and each of the second pole teeth and each of the third pole teeth adjacent to the first pole tooth in the circumferential direction are formed in such a manner that tooth tips are asymmetric with respect to the axial line in the radial direction and that the gap between the tooth tips of the second pole tooth and the third pole tooth is smaller than the gaps between the tooth tips of the second pole tooth and the first pole tooth and between the tooth tips of the third pole tooth and the first pole tooth.

As a result, even with the use of the stator in which the gap between the tooth tips of the second and third pole teeth are formed smaller than the gaps between the tooth tips of the second pole tooth and the first pole tooth and between the tooth tips of the third pole tooth and the first pole tooth, providing the auxiliary tooth tip sections on the tooth tips on circumferentially both sides of the first pole tooth and on the tooth tip of the second or third pole tooth facing the first pole tooth in the circumferential direction makes it possible to uniformly wind a coil around each pole tooth.

A winding method for a stator includes: a first step of preparing a stator core having a plurality of pole teeth which are provided in a circumferential direction of an annular section to protrude in a radial direction, and which are a mixture of the pole teeth having symmetric tooth tips with respect to an axis line in the radial direction and the pole teeth having asymmetric tooth tips with respect to the axis line in the radial direction, while intervals between the adjacent tooth tips in the circumferential direction are not uniform; a second step of integrally forming an auxiliary tooth tip section on the tooth tip of a required pole tooth of the stator core, and manufacturing the stator core in which gaps between the tooth tips of all the pole teeth of the stator core are uniform; a third step of fixing the stator core to a rotatable support table, and sandwiching both circumferential sides of one of the tooth tips of the pole teeth and sandwiching both ends in a lamination direction of one of the pole teeth around which a coil is to be formed at a predetermined position in the radial direction when a center former of a coil winding machine positions the pole tooth, and covering the pole teeth adjacent to both sides of the one pole tooth each with a side former; a fourth step of rotating a rotating cylindrical body with a magnet wire kept held by a nozzle provided in the rotating cylindrical body, moving the magnet wire into an open slot from a gap formed between the center former and the side former, and revolving the magnet wire to be wound around the pole tooth; a fifth step of repeating an action of moving the center former in the radial direction of the pole tooth by one pitch and further rotating the rotating cylindrical body to wind the magnet wire around the pole tooth, and forming a coil around the pole tooth; and a sixth step of separating the center former from the pole tooth and rotating the support table at a predetermined angle, and repeatedly executing the third step to the fifth step to the next pole tooth of the stator core to form the coil for each of all the pole teeth.

Both circumferential sides of one of the tooth tips of the pole teeth are sandwiched and both ends in a motor axial direction of one of the pole teeth a round which the coil is to be formed is sandwiched at the predetermined position in the radial direction when the center former of the coil winding machine positions the pole tooth, and the pole teeth adjacent to both sides of the one pole tooth are each covered with a side former.

As a result, the auxiliary tooth tip section is formed integrally on the tooth tip of the required pole tooth of the stator core and the gaps between the tooth tips of all the pole teeth of the stator core are made uniform. Therefore, even with the stator core in which there are wide gaps between the tooth tips of the pole teeth and narrow gaps therebetween, it is possible to prevent the center former of the coil winding machine from moving in the winding action during winding work and to uniformly form the coils. Furthermore, the intervals at which the magnet wire moves into the open slot of each pole tooth become uniform, so that it is possible to uniformly wind the coil around each pole tooth. Therefore, it is possible to improve productivity of winding work for the asymmetric core and reduce a fraction defective.

Advantageous Effects of Invention

According to the brushless motor, it is possible to uniformly wind coil windings even with a stator core in which the intervals between tooth tips of a plurality of pole teeth provided in a circumferential direction of an annular section to protrude in a radial direction differ. In addition, it is possible to prevent the motor characteristics from decreasing.

Moreover, according to the winding method for the stator, uniformly winding coil windings whether the intervals between the tooth tips of the pole teeth of the stator core are identical or different makes it possible to improve productivity and to reduce a fraction defective.

DESCRIPTION OF EMBODIMENTS

Embodiments of a brushless motor according to the present disclosure as well as a winding method for a stator will be described hereinafter with reference to the accompanying drawings. In the present embodiments, the brushless motor will be described while an outer rotor three-phase DC brushless motor is taken by way of example. It is noted that the brushless motor may be an arbitrary motor as long as the motor includes a stator core and winds a coil around each pole tooth, and may be an inner rotor motor.

Figure 1:
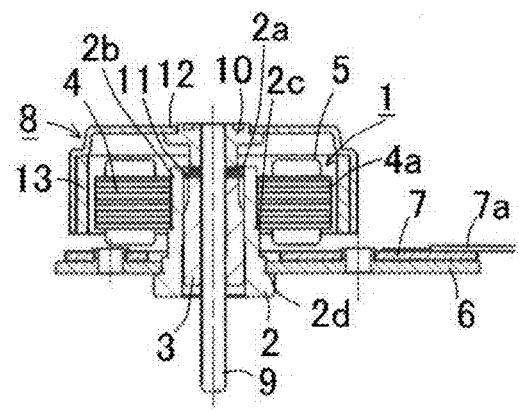
FIG. 1 is an axial cross-sectional, illustrative diagram of an outer rotor DC brushless motor.

A schematic configuration of the outer rotor three-phase DC brushless motor will be described with reference to FIG. 1. A structure of a stator 1 will be described. A cylindrical metal oil impregnated bearing 3 formed from a sintered metal is coaxially assembled to a shaft hole 2a of a housing 2 formed into a cylindrical shape. A stator core 4 is abutted on a stepped section 2c of this housing 2 along an end portion 2b on one end and an outer circumferential portion thereof to fixedly bond the stator core 4 to the housing 2. The stator core 4 is a laminated core and a coil 5 is wound around each of pole teeth 4a1, 4a2, and 4a3 (refer to FIG. 2) provided to protrude radially toward an outer circumference in a plan view.

Furthermore, a large-diameter stepped section 2d is formed on the outer circumference on the other end of the housing 2, and a mounting plate 6 is assembled to the stepped section 2d by being either press fitted into or caulked with the stepped section 2d. A motor board 7 is fixed to this mounting plate 6, and a sensor board (not shown) placing thereon a Hall element and the like is provided on the motor board 7. A power feeding interconnection 7a is connected to the motor board 7.

A structure of a rotor 8 will next be described with reference to FIG. 1. A rotor hub 10 formed by cutting brass or the like is fixedly press fitted into one side of a rotor shaft 9. A rotator yoke 12 formed into a cup shape is caulked and integrally assembled with this rotor hub 10. A rotational motion of the rotor 8 is supported by the metal oil impregnated bearing 3 inserted into the shaft hole 2a of the housing 2 into which the rotor shaft 9 is inserted. A normal load of the rotor 8 is supported by a washer 11 provided between the rotor hub 10 and the metal oil impregnated bearing 3.

A magnetic material is used for the rotor yoke 12. A ring-shaped rotor magnet 13 in which north poles and south poles are alternately magnetized in a circumferential direction is assembled to an inner circumferential surface of this rotor yoke 12. The rotor magnet 13 having an axial length larger than that of each pole tooth 4a of the stator core 4 is used. After assembling the stator 1, the rotor 8 is fitted into the stator 1 by inserting the rotor shaft 9 into the metal oil impregnated bearing 3. At this time, the rotor 8 is assembled to the stator core 4 so that the pole teeth 4a of the stator core 4 face the rotor magnet 13. The rotor 8 is assembled to the stator core 4 by magnetically attracting the rotor magnet 13 to the stator pole teeth 4a facing the rotor magnet 13, and the rotor shaft 9 is rotatably, pivotally supported by the housing 2 via the metal oil impregnated bearing 3.

A form of the stator 1 will next be described with reference to FIGS. 2 to 6.

Figure 2:
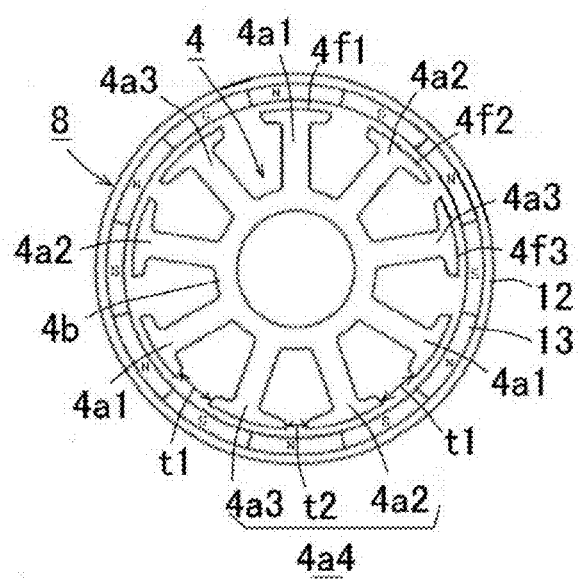
FIG. 2 is an illustrative diagram showing an arrangement and a configuration of a stator core and a rotor of FIG. 1.

In FIG. 2, the rotor magnet 13 of the rotor 8 is magnetized alternately to north and south poles in the circumferential direction, and a total number of magnetic poles is 12. Furthermore, a total number of pole teeth (number of poles) of the stator core 4 is nine (nine slots).

The nine pole teeth 4a (nine slots) provided on the stator core 4 in all each have the following shape. As shown in FIG. 2, the first pole teeth 4a1 face either the north poles or the south poles (for example, north poles) of the rotor magnet 13 in an overlapping manner and are formed symmetrically with respect to an axis line in a radial direction. Furthermore, the second pole teeth 4a2 and the third pole teeth 4a3 adjacent to the first pole teeth 4a1 in the circumferential direction are formed asymmetrically with respect to the axis line in the radial direction and are formed so that a gap t2 between the second pole tooth 4a2 and the third pole tooth 4a3 is smaller than a gap t1 between the first pole tooth 4a1 and the second or third pole tooth 4a2 or 4a3 (t1>t2; refer to FIG. 3A).

In other words, as shown in FIG. 2, a tooth tip 4f1 that serves as a magnetic flux acting surface of each first pole tooth 4a1 is symmetric with respect to the axis line in the radial direction and is arranged to face the north pole of the rotor magnet 13 in an overlapping manner to enable an attraction force to act between the tooth tip 4f1 and the north pole. In addition, a tooth tip 4f2 that serves as a magnetic flux acting surface of each second pole tooth 4a2 and a tooth tip 4f3 that serves as a magnetic flux acting surface of each third pole tooth 4a3 are asymmetric with respect to the axis line in the radial direction. The tooth tips 4f2 and 4f3 of the second pole tooth 4a2 and the third pole tooth 4a3 are regarded as a single pseudo second pole tooth 4a4 equivalent to the single pole tooth 4a, so that an attraction force acts between the tooth tips 4f2 and 4f3 and a plurality of rotor magnetic poles (for example, the south pole, the north pole and the south pole) facing the magnetic flux acting surfaces in an overlapping manner.

In FIG. 2, if it is assumed that the number of magnetic poles of the rotor magnet 13 is m (where m is an integer equal to or greater than 2: m=12 in FIG. 4A) and the number of pole teeth of the stator core 4 is P (where P is an integer equal to or greater than 3: P=9 in FIG. 2), a ratio P/m is expressed as P/m=9/12=3/4.

However, if the second pole tooth 4a2 and the third pole tooth 4a3 are regarded as the pseudo second pole tooth 4a4 as described above, then a total number of pole teeth P' is six with the first pole teeth (three) and the pseudo second pole teeth 4a4 (three), and P'/m=6/12=1/2. It is thereby possible to improve a cogging torque (holding torque).

Furthermore, auxiliary tooth tip sections 4c made of an insulating resin are formed integrally on the tooth tips of the required pole teeth 4a of the stator core 4, and gaps t between tooth tips 4f of all the pole teeth 4a of the stator core 4 are formed uniform.

Figure 4A:
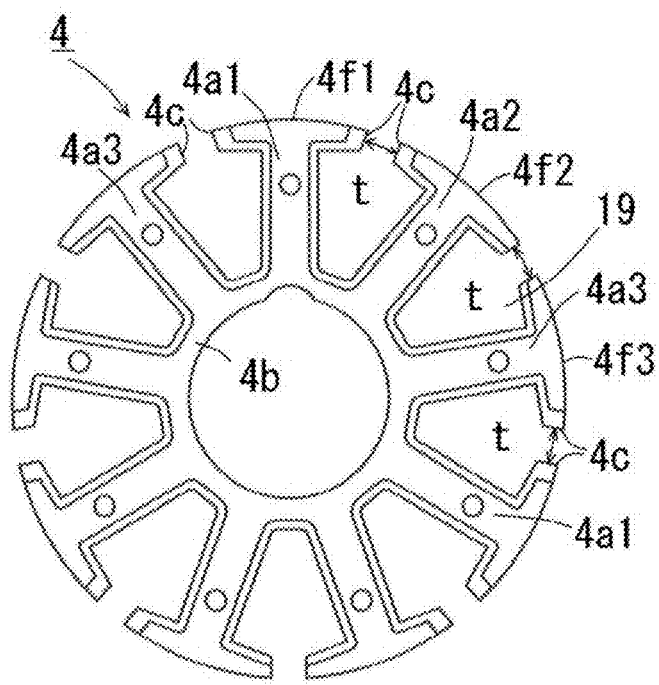
FIGS. 4A and 4B are a horizontal cross-sectional view and a perspective view of the stator core with auxiliary tooth tip sections insert molded on tooth tips of a required pole tooth of the stator core.
Figure 4B:
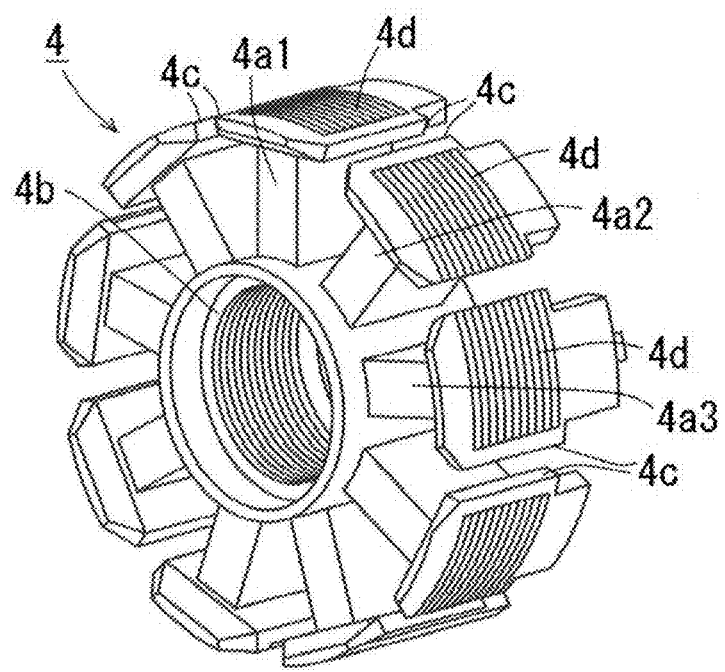

Specifically, as shown in FIGS. 4A and 4B, the auxiliary tooth tip sections 4c are insert molded to cover each pole tooth 4a of the stator core 4 using an insulating resin material. The auxiliary tooth tip sections 4c may be formed by coating a resin material, a rubber material, a metal material, or the like on the tooth tips of the required pole teeth 4a as an alternative to the insert molding. Examples of the insulating resin material include a PBT resin (polybutylene terephthalate resin), a PPS resin (poly(phenylene sulfide) resin), and a PA resin (polyamide resin).

As shown in FIG. 4B, an outer circumferential surface of an annular section 4b of the stator core 4 and outer circumferential surfaces of the first pole teeth 4a1, the second pole teeth 4a2, and the third pole teeth 4a3 except for magnetic flux acting surfaces 4d are integrally molded by either the insert molding or the coating (electrodeposition coating, resin coating, baked coating, metal coating, or the like) using the insulating resin material. The auxiliary tooth tip sections 4c are provided on both sides of the tooth tips 4f1 in the circumferential direction, the tooth tips 4f2 of the second pole teeth 4a2 adjacent to the tooth tips 4f1 of the first pole teeth 4a1 in the circumferential direction, and the tooth tips 4f3 of the third pole teeth 4a3 adjacent to the tooth tips 4f1 of the first pole teeth 4a1 in the circumferential direction, respectively.

Owing to this, as shown in FIG. 4A, the gaps t (open slots 19) between the adjacent tooth tips 4f1, 4f2, and 4f3 of the first pole teeth 4a1, the second pole teeth 4a2, and the third pole teeth 4a3 are formed to have a uniform magnitude.

While the stator core 4 has been described using the laminated core formed by laminating and pressing the magnetic steel sheets, the stator core 4 may be a stator core other than the laminated core such as an integral core formed by electrical discharge machining or laser cutting of metal plates and a core of a sintered metal formed by sintering metal powder.

In this way, even if the stator core 4 has the asymmetric pole teeth 4a, providing the auxiliary tooth tip sections 4c makes uniform the magnitudes of the gaps t (open slots 19) formed between the tooth tips 4f (4f1 to 4f3) of all the pole teeth 4a (first pole teeth 4a1 to third pole teeth 4a3). Therefore, in a case of inducing a magnet wire 18 into the open slots 19 by formers of a coil winding machine 15 to be described later, it is possible to suppress rattling of the former relative to the tooth tips and uniformly wind the coil around each pole tooth 4a.

Figure 5:
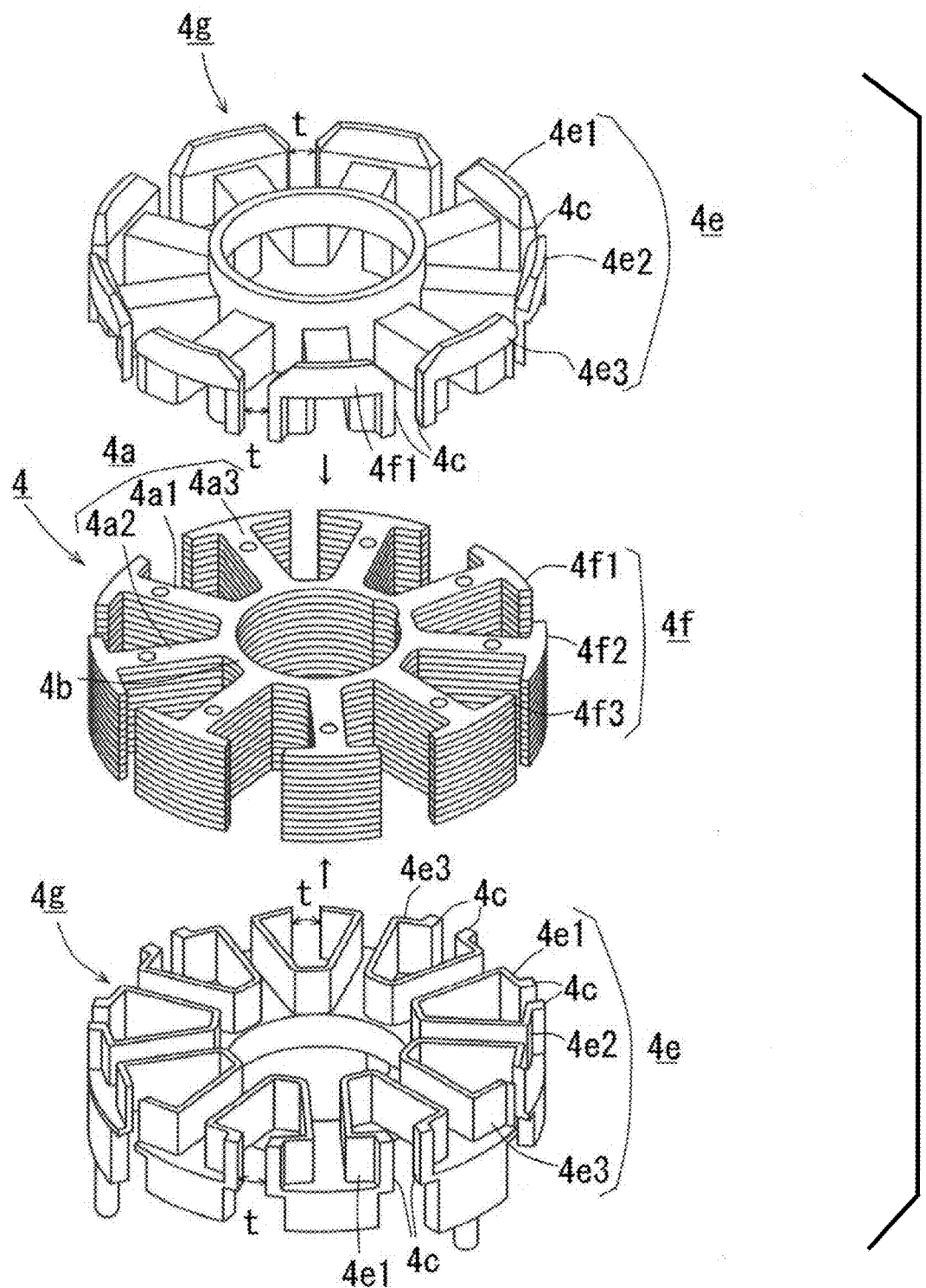
FIG. 5 is an exploded perspective view showing a pair of insulators attached to the stator core in an axial direction thereof.

Alternatively, as shown in FIG. 5, a pair of insulators 4g may be assembled with both sides of the stator core 4 in a motor axis direction in an overlapping manner, and the auxiliary tooth tip sections 4c may be formed as part of tooth tip attachment sections 4e (4e1 to 4e3) of the pair of insulators 4g. The pair of insulators 4g are molded with a resin using the insulating resin material described above in advance so that the tooth tip attachment sections 4e (4e1 to 4e3) are symmetric with respect to the axis line in the radial direction, irrespectively of symmetric/asymmetric shapes of the first to third pole teeth 4a1, 4a2, and 4a3. The annular section 4b that forms the stator core 4 and the pole teeth 4a (first pole teeth 4a1, second pole teeth 4a2, and third pole teeth 4a3) extending from the annular section 4b in the radial direction are assembled into the pair of insulators 4g by fitting the pair of insulators 4g into the annular section 4b and the pole teeth 4a from both sides in the motor axis direction in arrow directions. At this time, the tooth tip 4f1 of each first pole tooth 4a1 is attached to the tooth tip attachment sections 4e1 of the insulators 4g, the tooth tip 4f2 of each second pole tooth 4a2 is attached to the tooth tip attachment sections 4e2 of the insulators 4g, and the tooth tip 4f3 of each third pole tooth 4a3 is attached to the tooth tip attachment sections 4e3 of the insulators 4g. It is noted that the insulators 4g may be provided such that the tooth tips 4f1 to 4f3 serving as the magnetic flux acting surfaces are either exposed or not exposed. The auxiliary tooth tip sections 4c are provided on both sides of the tooth tip attachment sections 4e1 in the circumferential direction, the tooth tip attachment sections 4e2 adjacent to the tooth tip attachment sections 4e1 in the circumferential direction, and the tooth tip attachment sections 4e3 adjacent to the tooth tip attachment sections 4e1 in the circumferential direction, respectively.

With this structure, providing the auxiliary tooth tip sections 4c as part of the tooth tip attachment sections 4e of the insulators 4g makes it possible to make uniform the gaps t between the tooth tips 4f (4f1 to 4f3) of all the pole teeth 4a of the stator core 4.

Figure 6A:
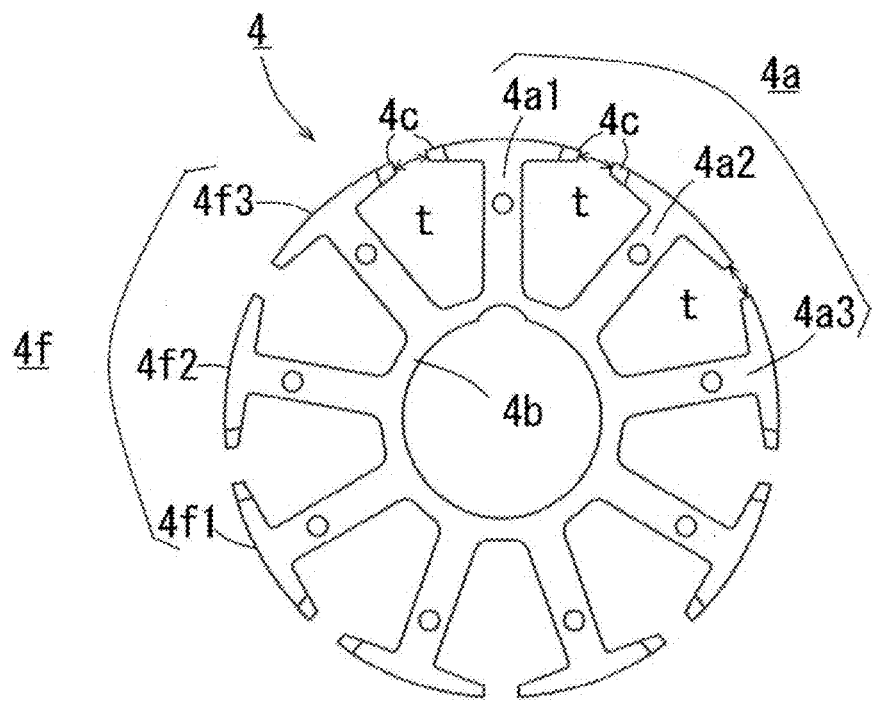
FIGS. 6A and 6B are a plan view and a perspective view of the stator core with the auxiliary tooth tip sections integrally formed only on tooth tips of a required pole tooth of the stator core.
Figure 6B:
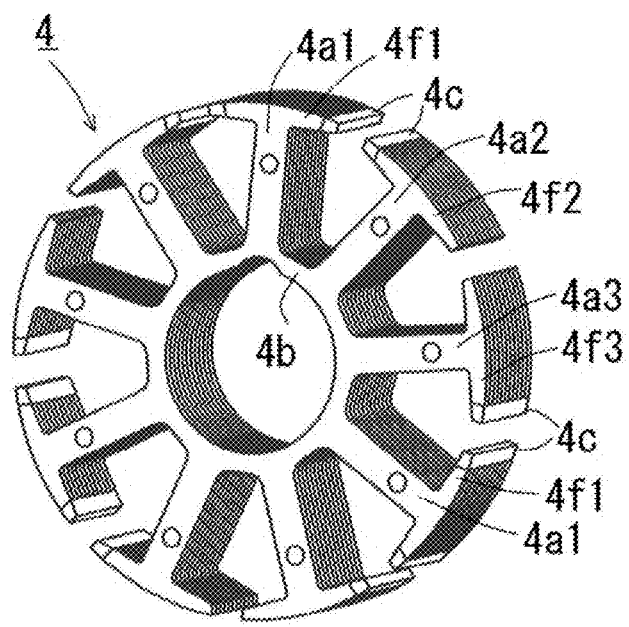

In another alternative, as shown in FIGS. 6A and 6B, the auxiliary tooth tip sections 4c may be the auxiliary tooth tip sections 4c made of the insulating resin and either bonded or welded to the tooth tips 4f of the required pole teeth 4a of the stator core 4.

Specifically, as shown in FIG. 6B, the auxiliary tooth tip sections 4c are either bonded or welded, by the insulating resin material, to both sides of the tooth tips 4f1 of the first pole teeth 4a1 in the circumferential direction, the tooth tips 4f2 of the second pole teeth 4a2 adjacent to the tooth tips 4f1 of the first pole teeth 4a1 in the circumferential direction, and the tooth tips 4f3 of the third pole teeth 4a3 adjacent to the tooth tips 4f1 of the first pole teeth 4a1 in the circumferential direction, respectively. It is noted that the auxiliary tooth tip sections 4c may be formed integrally with both sides of the tooth tips 4f1 of the first pole teeth 4a1, the tooth tips 4f2 of the second pole teeth 4a2, and the tooth tips 4f3 of the third pole teeth 4a3 by insert molding the auxiliary tooth tip sections 4c by the insulating resin material using a molding die or by coating the insulating resin material as an alternative to bonding or welding of the auxiliary tooth tip sections 4c.

As shown in FIG. 6A, this makes uniform the gaps t formed between the tooth tips 4f (4f1 to 4f3) of all the pole teeth 4a (first pole teeth 4a1 to third pole teeth 4a3) of the stator core 4.

A winding method for the stator 1 will next be described with reference to FIGS. 7 and 8. It is noted that the auxiliary tooth tip sections 4c provided on the pole teeth 4a of the stator core 4 are not depicted but indicated by virtual lines such as broken lines in FIGS. 7 and 8.

The stator core 4 having the asymmetric pole teeth 4a that are the plurality of first pole teeth 4a1, second pole teeth 4a2, and third pole teeth 4a3 provided in the circumferential direction shown in FIG. 2 to protrude in the radial direction is prepared. While the stator core 4 has been described using the laminated core formed by laminating and pressing the magnetic steel sheets, the stator core 4 may be a stator core other than the laminated core such as an integral core formed by electrical discharge machining or laser cutting of metal plates or a core of a sintered metal formed by sintering metal powder.

Figure 7A:
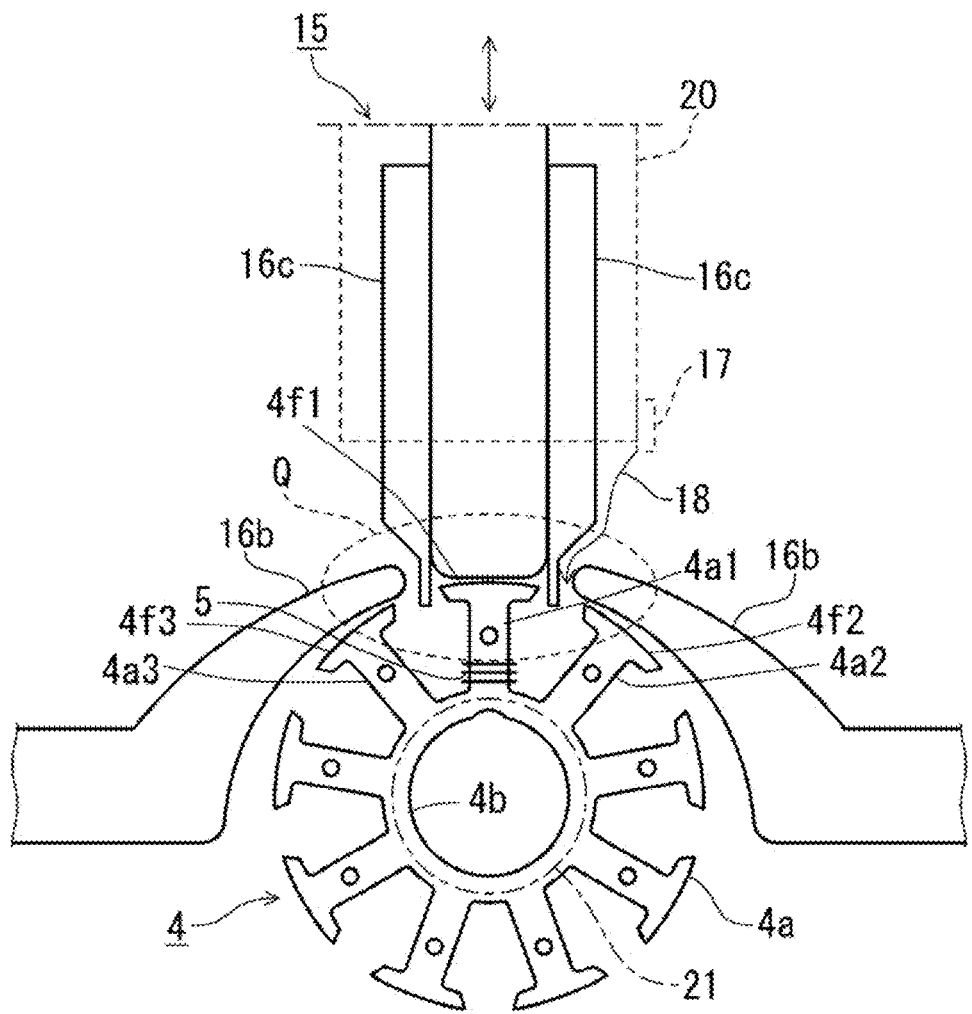
FIGS. 7A and 7B are schematic diagrams showing work for winding a magnet wire around each stator core provided with a guide core using a coil winding machine.
Figure 8A:
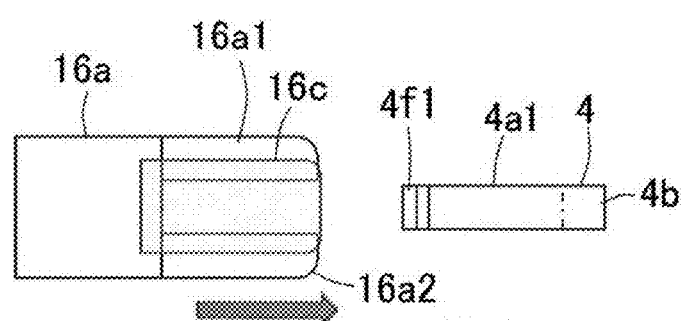
FIGS. 8A to 8C are state illustrative diagrams of a center former in response to a winding action of the coil winding machine.
Figure 8B:
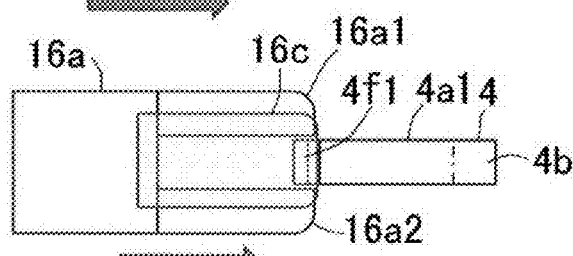

As shown in FIG. 7A, the magnet wire 18 is wound around the pole teeth 4a of the stator core 4 by the flyer-driven coil winding machine 15. While the stator core 4 is in a state in which the gaps between the tooth tips of all the pole teeth 4a including the first pole teeth 4a1, the second pole teeth 4a2, and the third pole teeth 4a3 are non-uniform, the auxiliary tooth tip sections 4c are formed on the required pole teeth 4a and the gaps between all the pole teeth 4a are formed to be the identical gap t as described later. The stator core 4 is placed on a pair of core stands (support tables) 21 and positioned by vertically sandwiching the annular section (core back section) 4b. The stator core 4 is rotatably supported while being kept clamped by the core stands 21.

The coil winding machine 15 includes a center former 16a movable in the radial direction of the pole teeth 4a and a pair of side formers 16b covering the adjacent pole teeth. The center former 16a is formed to have a constricted central portion with upper and lower former sections 16a1 and 16a2 extending forward (refer to FIG. 8A). A pair of side plates 16c are provided on both sides of the center former 16a. The paired side plates 16c guide the magnet wire 18 passing through a nozzle 17 into the open slots 19 through gaps between the side formers 16b and the side plates 16c to induce the magnet wire 18 to surroundings of the pole teeth 4a. It is noted that the pair of center former sections 16a1 and 16a2 are arranged concentrically within a cylindrical flyer (rotating cylindrical body) 20 and provided to be able to move forward and backward. The center former 16a does not rotate even when the flyer 20 rotates, so that a range of the center former 16a in which the center former 16a can move forward and backward with respect to the radial direction is wide, compared with the side plates 16c. The nozzle 17 that holds the magnet wire 18 is assembled integrally with an outer circumference of the flyer 20. When the flyer 20 rotates, the nozzle 17 that holds the magnet wire 18 also rotates.

An example of a winding method for an asymmetric core by the coil winding machine 15 will now be described with reference to FIGS. 3 to 9.

Figure 3A:
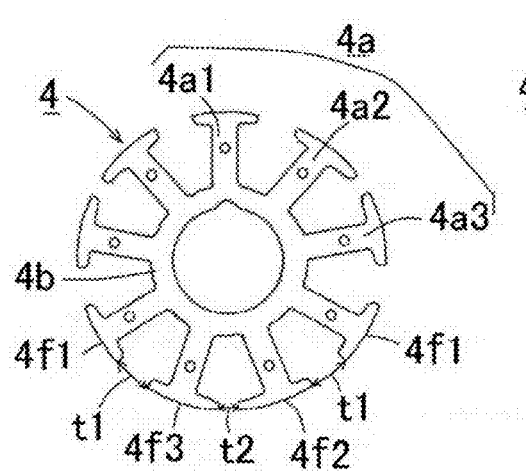
FIGS. 3A and 3B are a plan view and a perspective view of the stator core.
Figure 3B:
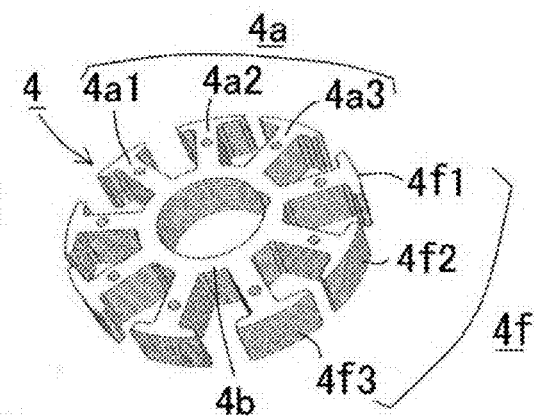

As shown in FIGS. 3A and 3B, the stator core 4 having the plurality of pole teeth 4a which are provided in the circumferential direction of the annular section 4b to protrude in the radial direction, and which are a mixture of the pole teeth having the symmetric tooth tips 4f with respect to the axis line in the radial direction and the pole teeth having asymmetric tooth tips 4f with respect to the axis line in the radial direction, while intervals between the adjacent tooth tips in the circumferential direction are not uniform, is prepared (in a first step). The stator core 4 may be the laminated core formed by laminating and pressing the magnetic steel sheets, or may be the stator core other than the laminated core such as the integral core formed by electrical discharge machining or laser cutting of the metal plates or the core of the sintered metal formed by sintering metal powder.

The auxiliary tooth tip sections 4c are formed integrally on the tooth tips 4f (4f1, 4f2, and 4f3) of the required pole teeth 4a (first pole teeth 4a1, second pole teeth 4a2, and third pole teeth 4a3) of the stator core 4. The auxiliary tooth tip sections 4c may be formed by setting the stator core 4 in a cavity of a molding die and filling the cavity with a molten insulating resin material to integrally mold the auxiliary tooth tip sections 3c or by coating the molten insulating resin material by spraying or the like and solidifying the insulating resin, as shown in FIGS. 4A and 4B. Alternatively, as shown in FIGS. 6A and 6B, the auxiliary tooth tip sections 4c may be formed by, for example, either bonding or welding the auxiliary tooth tip sections 4c made of the insulating resin to the tooth tips of the required pole teeth 4a of the stator core 4.

In another alternative, as shown in FIG. 5, the pair of insulators 4g may be attached to both sides of the stator core 4 in the motor axis direction, and the auxiliary tooth tip sections 4c may be formed out of part of the required tooth tip attachment sections 4e (4e1 to 4e3) provided in the pair of insulators 4g.

The auxiliary tooth tip sections 4c are formed integrally, by the insulating resin material, on both sides of the tooth tips 4f1 of the first pole teeth 4a in the circumferential direction, the tooth tips 4f2 of the second pole teeth 4a2 adjacent to the tooth tips 4f1 of the first pole teeth 4a1 in the circumferential direction, and the tooth tips 4f3 of the third pole teeth 4a3 adjacent to the tooth tips 4f1 of the first pole teeth 4a1 in the circumferential direction.

As a result, the stator core 4 in which the gaps t between the tooth tips 4f (4f1 to 4f3) of all the pole teeth 4a of the stator core 4 are uniform is manufactured (in a second step).

As shown in FIG. 7A, the annular section 4b of the stator core 4 is fixed while being sandwiched between the pair of upper and lower core stands 21 (in a third step). Specifically, the upper and lower former sections 16a1 and 16a2 of the center former 16a provided in the coil winding machine 15 as shown in FIG. 7A move forward to predetermined positions in the radial direction beyond, for example, the tooth tip 4f1 of the first pole tooth 4a1 of the stator 4 to sandwich the first pole tooth 4a1 therebetween in a lamination direction, and the side plates 16c move forward along with the center former 16a to sandwich both circumferential end portions of the tooth tip 4f1 of the first pole tooth 4a1 therebetween (refer to FIG. 8B). Furthermore, the tooth tips 4f2 and 4f3 of the second and third pole teeth 4a2 and 4a3 adjacent to both sides of the pole tooth 4a1 around which the coil 5 is formed are covered with the side formers 16b provided along with the core stands 21 (refer to FIGS. 7A and 7B).

Figure 7B:
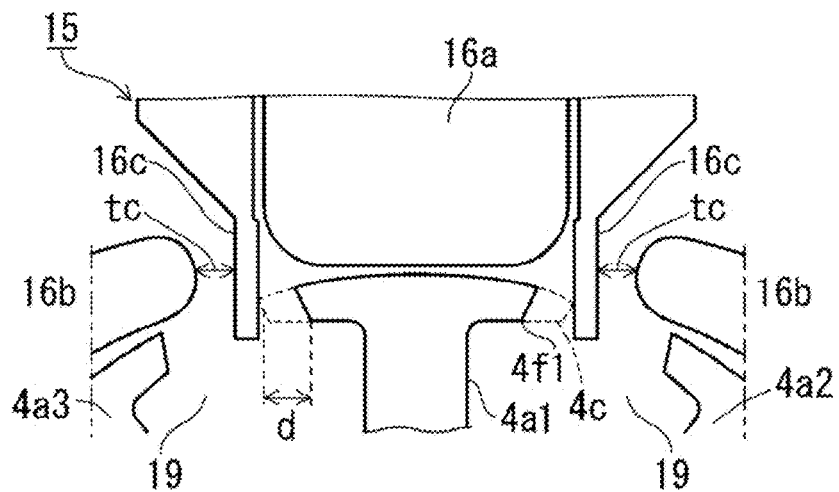

A tip end of the magnet wire 18 passing through the nozzle 17 provided in the cylindrical flyer 20 shown in FIG. 7A is locked to the core stands 21. As the rotation of the flyer 20 proceeds, the magnet wire 18 moves into the open slots 19 formed between the side plates 16c (center former 16a) and the side formers 16b, and the magnet wire 18 is revolved and wound around the first pole tooth 4a1 while being guided by the center former 16a (in a fourth step). At this time, without the auxiliary tooth tip sections 4c, there are concerns that gaps d are generated on both circumferential sides of the tooth tip 4f1 of the first pole tooth 4a1 as shown in FIG. 7B, behaviors of the center former 16a and the side plates 16c are not stable, and the center former 16a rattles with the rotation of the flyer 20, widths of gaps tc between the side plates 16c and the side formers 16b vary, and the coil 5 is not wound uniformly and broken. By using the stator core 4 having the auxiliary tooth tip sections 4c with the gaps t between the adjacent tooth tips 4f formed uniform (refer to FIGS. 4 to 6), by contrast, the side plates 16c firmly sandwich circumferential both sides of the auxiliary tooth tip section 4c of the pole tooth 4a therebetween, whereby even with the rotation of the flyer 20, the center former 16 is stable and does not rattle; thus, the magnet wire 18 is induced into the open slots 19 through the uniform gaps tc between the side plates 16c and the side formers 16b and can be wound around the pole tooth 4a at a constant winding diameter (refer to FIG. 7B).

Figure 8C:
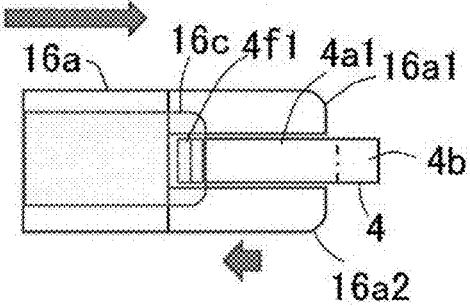

When the magnet wire 18 is revolved, then the center former 16a is moved radially outward of the pole tooth, that is, radially outward by one pitch (leftward as indicated by an arrow) as shown in FIG. 8C, and the flyer 20 is further rotated to wind the magnet wire 18 around the first pole tooth 4a1 (or the insulators 4g if the insulators 4g are provided). The flyer 20 that holds the nozzle 17 is rotated to revolve the magnet wire 18 around the pole tooth 4a, and the center former 16a is moved radially outward by one pitch whenever the magnet wire 18 is revolved, thereby sequentially winding the magnet wire 18 from the proximal end portion of the first pole tooth 4a1 (annular section 4b) toward the tooth tip 4f1 to form the coil 5 in the open slot 19 (in a fifth step).

Next, the center former 16a is separated from the first pole tooth 4a1 (for example, U-phase pole tooth) around which the coil 5 has been wound and rotated at a predetermined angle (for example 120°) with the stator core 4 kept clamped to the pair of upper and lower core stands 21, and the second to fourth steps are repeatedly executed to the next first pole tooth 4a1 (for example, U-phase pole tooth). The steps described above are executed to form the coils 5 corresponding to a U-phase, a V-phase, and a W-phase around all the first pole teeth 4a1, the second pole teeth 4a2, and the third pole teeth 4a3 (in a sixth step).

According to the winding method described so far, when the pole tooth 4a around which the coil 5 is to be formed is sandwiched between the pair of center formers 16a of the coil winding machine 15, an action of inducing the magnet wire 18 into the open slots 19 via the uniform gaps tc between the side plates 16c and the side formers 16b is performed stably, and the center former 16a does not rattle even with the rotation of the flyer 20; thus, it is possible to uniformly wind the coil 5 around each pole tooth 4a. Therefore, it is possible to improve productivity of winding work for the asymmetric core and reduce a fraction defective. Furthermore, a reduction in a strength of the pole tooth 4a does not occur since the auxiliary tooth tip sections 4c are formed integrally on the tooth tip 4f at a time of fixing each pole tooth 4a of the stator core 4 by the side plates 16c of the coil winding machine 15.

Figure 9A:
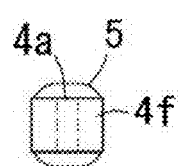
FIGS. 9A to 9E are contrast and illustrative diagrams showing wound states of coils wound around pole teeth of different shapes, depending on presence/absence of the guide core.
Figure 9B:
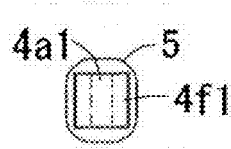
Figure 9C:
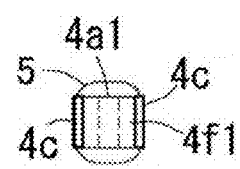
Figure 9D:
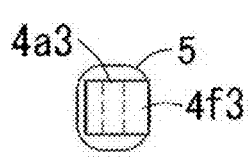
Figure 9E:
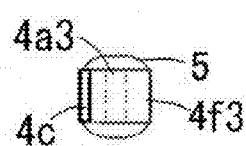
Figure 10:
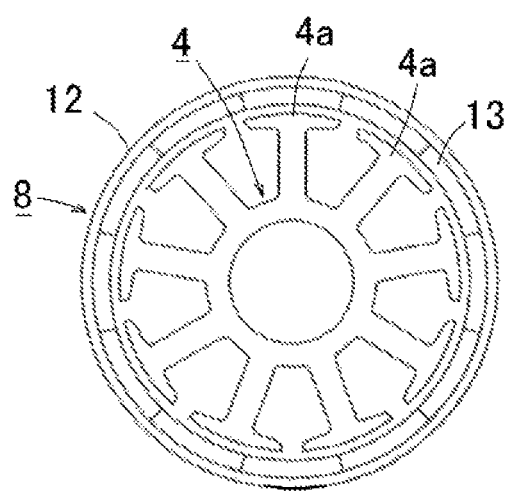
FIG. 10 is an illustrative diagram showing an arrangement and a configuration of a stator core with tooth tips of a symmetric shape and a rotor.

FIG. 9A shows a coil wound state in a case in which the tooth tips 4f of, for example, the pole teeth 4a of the stator core 4 are arranged at equal intervals and symmetric, FIGS. 9B and 9C show coil wound states depending on presence/absence of the auxiliary tooth tip sections 4c in a case in which the tooth tip 4f1 of, for example, the first pole tooth 4a1 of the stator core 4 is symmetric but the tooth tip 4f1 is short in the circumferential direction, and FIGS. 9D and 9E show coil wound states depending on presence/absence of the auxiliary tooth tip sections 4c in a case in which the tooth tip 4f3 of, for example, the third pole tooth 43a of the stator core 4 is asymmetric.

In a case in which the tooth tips 4f of the pole teeth 4a of the stator core 4 are arranged at equal intervals and symmetric as shown in FIG. 9A, the auxiliary tooth tip sections 4c are unnecessary and the coil 5 can be wound without a change in the coil wound state.

However, as shown in FIG. 9B, in a case in which the tooth tip 4f1 of the first pole tooth 4a1 of the stator core 4 is symmetric but is short in the circumferential direction, the tooth tip 4f1 cannot be sandwiched between the side plates 16c (refer to FIG. 7B); thus, the center former 17a rattles with the rotation of the flyer 20, a gap is generated between the coil 5 and the first pole tooth 4a1, and the coil 5 cannot be wound at a constant diameter. As shown in FIG. 9C, by contrast, when the auxiliary tooth tip sections 4c are formed on both circumferential sides of the tooth tip 4f1 of each first pole tooth 4a1, the first pole teeth 4a1 are formed symmetric with respect to the axis line in the radial direction at the constant intervals; thus, the tooth tip 4f1 (refer to FIG. 7B) can be sandwiched between the side plates 16c. Owing to this, the center former 16a does not rattle with the rotation of the flyer 20 and the coil 5 can be wound stably.

Furthermore, when the center former 16a is used at a width of the asymmetric third pole tooth 4a3 as shown in FIG. 9D, the gaps d (refer to FIG. 7B) are generated between the tooth tip 4f3 and the side plates 16c; thus, the center former 16a rattles with the rotation of the flyer 20. Owing to this, the magnet wire 18 is guided by the center former 16a and wound around the pole tooth 4a; thus, the coil 5 cannot be wound stably.

As shown in FIG. 9E, by contrast, when the auxiliary tooth tip section 4c is formed on the third pole tooth 4a3, the third pole tooth 4a3 is symmetric with respect to the axis line in the radial direction and formed with the constant interval t (refer to FIG. 4A) from the adjacent pole teeth; thus, the tooth tip 4a3 (refer to FIG. 7B) can be sandwiched between the side plates 16c. Owing to this, the center former 16a does not rattle with the rotation of the flyer 20 and the coil 5 can be wound stably.

Moreover, the three-phase DC brushless motor is used as a drive source for a purpose of holding the rotor at a predetermined position in the HVAC (heating, ventilation, and air conditioning) device or the like.

Furthermore, the auxiliary tooth tip sections can be formed using not only the insulating resin material described above but also various members such as the other resin material, a metal material, and a rubber material.

Further, while the magnetic flux acting surface of each pole tooth has been exposed at a time of forming the auxiliary tooth tip sections by the insert molding, the coating, or the like, the magnetic flux acting surface is not necessarily exposed.

Moreover, the embodiments have been described while the outer rotor brushless motor is taken by way of example; however, the embodiments are also applicable to an inner rotor brushless motor by replacing arrangement of the rotor magnet with that of the stator core.

What is claimed is:

1. A brushless motor comprising:
   a stator including a stator core with a coil wound around a stator pole tooth; and
   a rotor having a rotor shaft that is provided in a central portion of a rotor yoke on which a rotor magnet facing the stator pole tooth is provided and that is rotatably supported via a bearing,
   the stator core being configured such that a plurality of first pole teeth, second pole teeth, and third pole teeth are provided in a circumferential direction to protrude, in this order, from a plurality of parts of the annular section in a radial direction, each of the first pole teeth having a tooth tip formed symmetric with respect to an axial line in the radial direction and each of the second pole teeth and each of the third pole teeth adjacent to the first pole tooth in the circumferential direction are formed in such a manner that tooth tips are asymmetric with respect to the axial line in the radial direction and that a gap between the tooth tips of the second pole tooth and the third pole tooth is smaller than gaps between the tooth tips of the second pole tooth and the first pole tooth and between the tooth tips of the third pole tooth and the first pole tooth, wherein nonmagnetic auxiliary tooth tip sections are formed integrally on tooth tips of the first pole teeth located on both sides in the circumferential direction and tooth tips of the second pole teeth and on the third pole teeth located adjacent to the first pole teeth, the auxiliary tooth tip sections are insert molded or coated with a nonmagnetic material into the tooth tips of the first pole teeth located on both sides in the circumferential direction and into the tooth tips of the second pole teeth and the third pole teeth located adjacent to the first pole teeth of the stator core, and gaps between the nonmagnetic auxiliary tooth tip sections of the first pole teeth, the second pole teeth and the third pole teeth of the stator core are formed uniform.

2. A brushless motor comprising:

a stator including a stator core with a coil wound around a stator pole tooth; and a rotor having a rotor shaft that is provided in a central portion of a rotor yoke on which a rotor magnet facing the stator pole tooth is provided and that is rotatably supported via a bearing, the stator core being configured such that a plurality of first pole teeth, second pole teeth, and third pole teeth are provided in a circumferential direction to protrude, in this order, from a plurality of parts of the annular section in a radial direction, each of the first pole teeth having a tooth tip formed symmetric with respect to an axial line in the radial direction and each of the second pole teeth and each of the third pole teeth adjacent to the first pole tooth in the circumferential direction are formed in such a manner that tooth tips are asymmetric with respect to the axial line in the radial direction and that a gap between the tooth tips of the second pole tooth and the third pole tooth is smaller than gaps between the tooth tips of the second pole tooth and the first pole tooth and between the tooth tips of the third pole tooth and the first pole tooth, wherein a pair of insulators are attached to both sides of the stator core in a motor axis direction to form the auxiliary tooth tip sections integrally on the tooth tips of the first pole teeth located on both sides in the circumferential direction and on the tooth tips of the second pole teeth and the third pole teeth located adjacent to the first pole teeth in part of the insulators in such a manner that gaps between the nonmagnetic auxiliary tooth tip sections of the first pole teeth, the second pole teeth and the third pole teeth of the stator core are formed uniform.

3. A brushless motor comprising:

a stator including a stator core with a coil wound around a stator pole tooth; and a rotor having a rotor shaft that is provided in a central portion of a rotor yoke on which a rotor magnet facing the stator pole tooth is provided and that is rotatably supported via a bearing, the stator core being configured such that a plurality of first pole teeth, second pole teeth, and third pole teeth are provided in a circumferential direction to protrude, in this order, from a plurality of parts of the annular section in a radial direction, each of the first pole teeth having a tooth tip formed symmetric with respect to an axial line in the radial direction and each of the second pole teeth and each of the third pole teeth adjacent to the first pole tooth in the circumferential direction are formed in such a manner that tooth tips are asymmetric with respect to the axial line in the radial direction and that a gap between the tooth tips of the second pole tooth and the third pole tooth is smaller than gaps between the tooth tips of the second pole tooth and the first pole tooth and between the tooth tips of the third pole tooth and the first pole tooth, wherein nonmagnetic auxiliary tooth tip sections are formed integrally on tooth tips of the first pole teeth located on both sides in the circumferential direction and tooth tips of the second pole teeth and on the third pole teeth located adjacent to the first pole teeth, the auxiliary tooth tip section is either bonded or welded to the tooth tip of the first pole teeth located on both sides in the circumferential direction and to the tooth tips of the second pole teeth and the third pole teeth of the stator core, and the gaps between the nonmagnetic auxiliary tooth tip sections of the first pole teeth, the second pole teeth and the third pole teeth of the stator core are formed uniform.

* * * * *